(12) United States Patent
Kamisuwa et al.

(10) Patent No.: US 6,747,766 B1
(45) Date of Patent: Jun. 8, 2004

(54) COLOR IMAGE READER FOR USE IN IMAGE FORMING APPARATUS

(75) Inventors: Yoshikatsu Kamisuwa, Kawasaki (JP); Koji Tanimoto, Kawasaki (JP); Rintaro Nakane, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 625 days.

(21) Appl. No.: 09/661,406

(22) Filed: Sep. 13, 2000

(51) Int. Cl.[7] .............................................. H04N 1/419
(52) U.S. Cl. ........................ 358/505; 358/1.9; 358/514
(58) Field of Search ........................ 358/1.9, 475, 509, 358/505, 514, 513, 518, 515, 517, 538, 406, 494, 504

(56) References Cited

U.S. PATENT DOCUMENTS

| 4,285,004 A | * | 8/1981 | Morrison et al. | ............. 358/10 |
| 6,587,224 B1 | * | 7/2003 | Nabeshima et al. | ......... 358/1.9 |

FOREIGN PATENT DOCUMENTS

| JP | 5-122542 A | 5/1993 | ............ H04N/1/42 |
| JP | 10-42157 | 2/1998 | ............ H04N/1/46 |
| JP | 11-69105 A | 3/1999 | ............ H04N/1/46 |
| JP | 11-77836 A | 7/1999 | ............ H04N/1/40 |
| JP | 2000-22968 A | 1/2000 | ............ H04N/1/48 |
| JP | 2000-236450 A | 8/2000 | ............ H04N/1/46 |

* cited by examiner

Primary Examiner—Kimberly Williams
Assistant Examiner—Negussie Worku
(74) Attorney, Agent, or Firm—Foley & Lardner LLP

(57) ABSTRACT

A color image reader according to the present invention has a reading object holder which is plate shape and which can transmit light and holds the subject to be read, a lighting device for illuminating the subject to be read on the reading object holder a reducing lens for providing convergence to the image light from the reading object, a 3-line CCD sensor for receiving the image light with convergence given by the reducing lens and outputting three electrical signals corresponding to the image light, and a lateral chromatic aberration correction circuit for designating one output signal of the three output signals outputted from the 3-line CCD sensor to the reference, comparing the two remaining output signals with the output signal used for the reference, and providing a predetermined correction to the two remaining output signals, and can suppress generation of image color deviation which depends on the distance between the 3-line CCD sensor and the optical axis of the reducing lens.

11 Claims, 8 Drawing Sheets

FIG. 11B DATA ON j LINE
FIG. 11C DATA ON j+1 LINE

COLOR IMAGE READER FOR USE IN IMAGE FORMING APPARATUS

BACKGROUND OF THE INVENTION

The present invention relates to an image reader, for example, for obtaining an image data corresponding to image information of the object as well as an image forming apparatus capable of forming the image corresponding to image information read by the image reader.

An image reader includes a transparent glass plate for holding the subject (original holding section), lighting lamp for illuminating the subject set to the original holding section (lighting unit), CCD sensor for receiving and photoelectrically converting the reflected light from the subject illuminated by the lighting unit (photoelectric converting element), optical set disposed between the original holding section and the photoelectric converting element (mirror and image forming lens), etc.

In this kind of image reader (image reading section), a few mirrors contained in the lighting unit and the optical set are installed along the shorter side of the original table, and are moved in the direction of other orthogonal one side (of the original table) at a predetermined speed. With this configuration, the image of the subject is taken out as a contrast of the light with respect to the elongated illuminated range in the first direction (shorter side of the original table) defined by the illuminating light from the lighting lamp and is guided to the light receiving surface of the CCD sensor. In addition, by allowing the lighting lamp to be moved in the second (other side) direction where the two lights from the first and the second (other one side) directions cross at right angles, the image of the overall region of the subject to be read is taken out as a contrast of light and is guided to the light receiving surface of the CCD sensor.

In the image reader (image reading section) described above, the resolution of the image (optical image) formed on the light receiving surface (photosensitive surface of the photosensitive material) of the CCD sensor is optimized by adjusting the distance between the front-side main plane of the image forming lens and the surface with which original is brought in contact of the two surfaces of the glass plates of the original holding section, distance between the rear-side main plane of the image-forming lens and the light receiving surface of the CCD (photosensitive surface of the photosensitive drum), and the position for a plurality of subjects to be adjusted represented by the gradient of mirrors of the optical set or the fixed position of the CCD sensor, and the like.

The image information photoelectrically converted by the CCD sensor is used for modulating the intensity of laser beam outputted from the laser exposure device of the exposure system in forming the latent image onto the photosensitive material, for example, in the digital copying machine, and the like.

By the way, in an analog copying machine in which a return mirror is arranged in place of the CCD sensor to guide the reflected light from the subject directly to the photosensitive material as it is, the image reading section having the original holding section, lighting unit, and optical set has the similar configuration.

Now, in order to read the image information of the original in full colors, today, a color image reader using a color CCD sensor has been put into practical use.

However, when the three-line CCD sensor is used for the color CCD sensor, the image information of the original projected on the three line sensors of R (red), G (green), and B (blue) by the reducing lens is irradiated on one line sensor located on an optical axis of the reducing lens and two line sensors located at a predetermined distance with respect to the optical axis of the reducing lens in the plane that intersects the optical axis of the reducing lens at right angles.

Consequently, photoelectrically converting the image of the original projected to the three-line CCD sensor provides sizes (widths) varied in accordance with each color component by the lateral chromatic aberration of the reducing lens. As a result, in the image signal outputted, color deviation must be included. The magnitude of color deviation associated with lateral chromatic aberration is able to be alleviated by optimally designing the reducing lens, but because of the limit of lens performance and cost increase, color deviation is unable to be completely removed. In addition, because the resolution of the image forming apparatus has been improved, color deviation of the image becomes conspicuous even if slight lateral chromatic aberration remains.

In Jpn. Pat. Appln. KOKAI Publication No. 10-42157, there are disclosed an image processing method and its apparatus for correcting color deviation resulting from vibration of structural elements of the image reader.

The image processing method disclosed in the above-mentioned patent publication relates to a method for reading an image of "Mansen" original (black-and-white pair-line chart in which black fine lines of a predetermined width extending in the sub-scanning direction are drawn at predetermined intervals on white paper), finding the color deviation amount from the intersecting point of "Mansen" data read with the predetermined threshold value, interpolating them and preparing the color deviation amount table that corresponds to each pixel position, correlating the color deviation amount table with the image data of pixels in the vicinity of the noted pixel, and thereby correcting color deviation of the noted pixel (position of the noted pixel on the color deviation amount table).

However, the image processing method disclosed in the above-mentioned patent publication has a problem of greatly varying the calculation results when the output data of two pixels in front and behind are affected by noise because the positional deviation amount is found from the two pixels before and behind the predetermined threshold value when the positional deviation amount is calculated from the "Mansen" data. Further, the above-mentioned method is unable to find the position deviation amount of all the pixels in one process because it is the upper limit to obtain the frequency ½ the pixel cycle when the "Mansen" chart is used for calculating the position deviation amount with the Shannon's sampling theorem taken into account, and the method must interpolate the intermediate data by the use of the data obtained. In addition, because the method needs memory for storing the color deviation amount corresponding to each pixel position, it also has a problem in that it needs a memory for storing the color deviation amount for a total of 3 lines in which the two remaining colors are added to one reference color.

BRIEF SUMMARY OF THE INVENTION

Accordingly, it is an object of the present invention to provide a color image reader for generating image signals utilized for a color image forming apparatus that can suppress generation of image color deviation which depends on the distance between the 3-line CCD sensor and the optical axis of the reducing lens.

The present invention provides a color image reader comprising:
  a reading object holder, having plate shape and which can transmit light, for holding the subject to be read;
  a lighting device for illuminating the subject to be read on the reading object holder;
  a reducing lens for providing convergence to the image light from the reading object;
  a 3-line CCD sensor for receiving the image light with convergence given by the reducing lens and outputting three electrical signals corresponding to the image light; and
  a lateral chromatic aberration correction circuit for designating one output signal of the three output signals outputted from the 3-line CCD sensor to the reference, comparing the two remaining output signals with the output signal used for the reference, and providing a predetermined correction to the two remaining output signals.

The present invention provides an image reading method having:
  a reading object holder, having plate shape and rectangular form with four sides, for holding a reading object;
  a lighting device for illuminating the reading object on the reading object holder;
  a reducing lens for providing convergence to the image light from the reading object;
  a 3-line CCD sensor containing three line sensors and receiving the image light in the form of band extending in the first direction from the reading object with convergence given by the reducing lens for each color component, and outputting electrical signals corresponding to the respective lights; and
  a lateral chromatic aberration correction circuit for designating one output signal of the three output signals outputted from the 3-line CCD sensor to the reference, comparing the two remaining output signals with the output signal used for the reference, and providing a predetermined correction to the two remaining output signals, and
  comprising the steps of:
    reading the test chart images;
    determining output signals from individual line sensors corresponding to the test chart images; and
    comparing the two remaining output signals with the output signal used for the reference, and providing a predetermined correction to the two remaining output signals with one of the three output signals outputted from the individual line sensors of the 3-line CCD sensor used as a reference.

Furthermore, the present invention provides a color image forming apparatus comprising:
  a color image reader including;
    a reading object holder, having plate shape and can transmit light, for holding the reading object;
    a lighting device for illuminating the reading object on the reading object holder;
    a reducing lens for giving convergence to the image light from the reading object;
    a 3-line CCD sensor for receiving the image light with convergence given by the reducing lens and outputting three electrical signals corresponding to the image light; and
    a lateral chromatic aberration correction circuit for designating one output signal of the three output signals outputted from the 3-line CCD sensor to the reference, comparing the two remaining output signals with the output signal used for the reference, and providing a predetermined correction to the two remaining output signals;
  an exposure device for irradiating the exposed light with the light intensity varied in correspondence with the output image signal generated by the color image reader to a predetermined position;
  the first and the second image forming apparatus in which each of the image forming apparatuses comprises a photosensitive material which is a light receptor, a developing apparatus for selectively supplying the visualized material to the photosensitive material, a transcription apparatus for transcribing the visualized material from the photosensitive material to the transferred material, wherein individual image forming apparatus which supply the visualized material by the developing apparatus to the latent image formed on the photosensitive material by the exposed light irradiated from the exposure apparatus to visualize the image and form the visualized image are disposed in a predetermined arrangement, and form a plurality of toner images for each color component in correspondence with the output image signals for each color component supplied from the color image reader in conformity to time series;
  a transferred material conveying mechanism located at a predetermined position with respect to each of the transcription apparatus of the first and the second image forming apparatus and conveying the visualized image formed by the first and the second image forming apparatus transcribably onto the transferred material while the transferred material fed from the storage section is being conveyed; and
  a fixing apparatus including a heating mechanism and pressurizing mechanism, for fixing the visualized image transferred on the transferred material to the transferred material being conveyed by the transferred material conveying mechanism.

BRIEF DESCRIPTION OF THE SEVERAL VIEWS OF THE DRAWING

FIG. 11B is a schematic diagram showing the center of balance of the output image waveform when the chart shown in FIG. 10 is read in the timing of "j" in FIG. 11A;

FIG. 11C is a schematic diagram showing the center of balance of the output image waveform when the chart shown in FIG. 10 is read in the timing of "j+1" in FIG. 11A;

DETAILED DESCRIPTION OF THE INVENTION

Referring now to drawings, a color image forming apparatus of one embodiment according to the present invention will be described in detail as follows.

Figure 1:
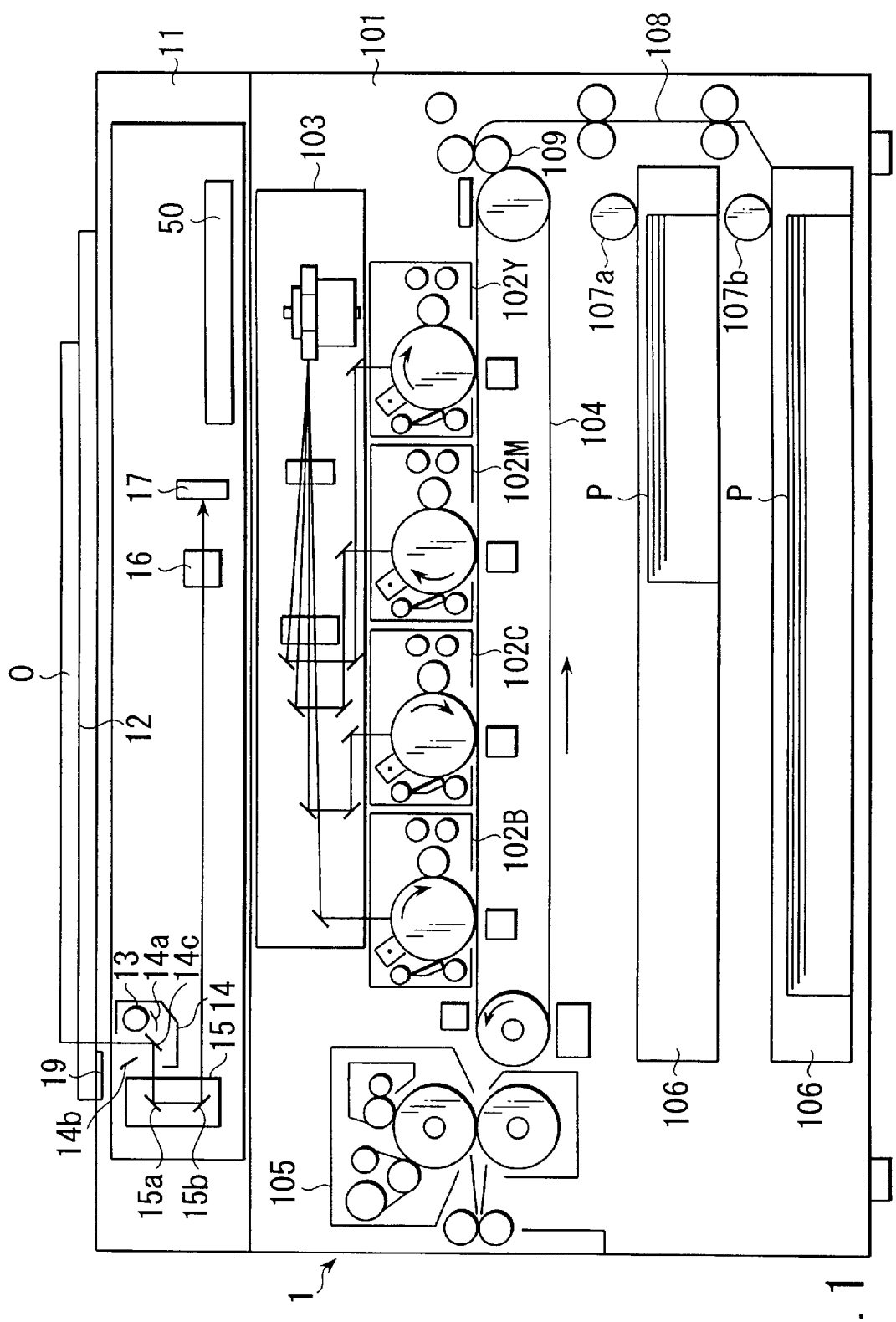
FIG. 1 is a schematic diagram showing an example of an image forming apparatus to which the image reader according into the present invention is applied.

FIG. 1 is a schematic diagram for describing a color digital copying machine which is an example of image forming apparatus in which the color image reader according to the present invention is incorporated.

As shown in FIG. 1, the color digital copying machine 1 includes a color image reader (scanner) 11 for catching the image information of the copied subject not illustrated as a contrast of light and generating image signals that correspond to the image information, and an image forming apparatus 101 for forming images corresponding to image signals supplied from the scanner 11 or outside.

The image forming apparatus 101 has four image forming sections 102Y, 102M, 102C, and 102B for forming images of four colors of Y (yellow), M (magenta), and C (cyan), which are three color components enabling the application of subtractive primaries, and B (black) for reinforcing a contrast, an exposure apparatus 103 for irradiating the exposed light, for example, laser beam, with the light intensity intermittently varied in response to image signals supplied from the scanner 11 or the outside to the photosensitive drum installed at each of the image forming sections, a transfer belt 104 for superimposing images formed at each image forming section successively on paper P while the sheet of paper P which is a transferred material, is being conveyed, a fixing apparatus 105 for fixing the developer image on the sheet of paper P by heating and pressurizing the sheet of paper P and image (on sheet of paper P) (developer image) conveyed by the transfer belt 104. To each of image forming sections 102Y, 102M, 102C, and 102B, a developing apparatus that contains the developer (toner) for reproducing the corresponding color is installed at a predetermined position near the photosensitive drum of each image forming section, respectively.

At the predetermined position below the transfer belt 104, paper cassettes 106a, 106b for housing sheets of paper to which toner image formed at each image forming section is transferred are disposed.

To each of paper cassettes 106a, 106b, pickup rollers 107a, 107b for taking out sheets of paper P one by one are installed. Between each paper cassette 106a, 106b and the transfer belt 104, a paper conveying section 108 that contains guides and rollers for feeding and delivering the sheet of paper P taken out by either of the pickup rollers to the transfer belt 104 is formed.

At the predetermined position on the transfer belt 104 side of the paper conveying section 108, aligning rollers 109 are installed for setting the timing for delivering the sheets of paper towards the transfer belt 104 in order to adjust the position of the sheet of paper P taken out from either of the cassettes and being conveyed to the position of the image formed at individual image forming section.

In the color image forming apparatus 101 shown in FIG. 1, when the image signal is supplied from the scanner 11 or the external apparatus, the photosensitive drum of each image forming section is charged to a predetermined potential by a charging apparatus not illustrated and connected to the charging power supply unit not illustrated, and laser beam with the light intensity intermittently varied in correspondence to the image signal is applied to each of the photosensitive drums from the exposure equipment 103.

By this, on the photosensitive drums of the four image forming sections 102Y, 102M, 102C and 102B, a static latent image corresponding to the color image to be outputted is formed.

By the way, the timing of exposing the image to the photosensitive drum of each image forming section is defined in the predetermined order in conformity to the move of the sheet of paper P conveyed on the transfer belt 104.

The static latent image formed on the photosensitive drum of each image forming section is developed by the toner selectively supplied by the developing apparatus that contains the toners (developers) of corresponding predetermined colors and is successively transferred on one surface of the sheet of paper P on the transfer belt 104 by the transferring apparatus opposite to the photosensitive drum with the transfer belt 104 interposed therebetween. The sheet of paper P is taken out from a cassette that contains paper of the pre-selected size or the size corresponding to the size of the image exposed by the exposure apparatus. 103, conveyed to the aligning roller 109 of the paper conveyor section 108, and temporarily stopped at the aligning roller 109. In addition, the sheet of paper P is fed from the aligning roller 109 to the transfer belt 104 in the exposure timing of the first color image by the exposure apparatus 103 or a predetermined timing. The sheet of paper is charged with a not-illustrated charging device (for paper) installed in the vicinity of the roller on the paper feeding section side for supporting the transfer belt 104, is brought in close contact with the transfer belt 104, and is conveyed by the transfer belt 104 as the transfer belt 104 rotates.

The sheet of paper P with the toner, that is, toner image formed by each image forming section transferred is conveyed to the fixing apparatus 105 and is fixed with the toner melted by the fixing apparatus 105.

Figure 2:
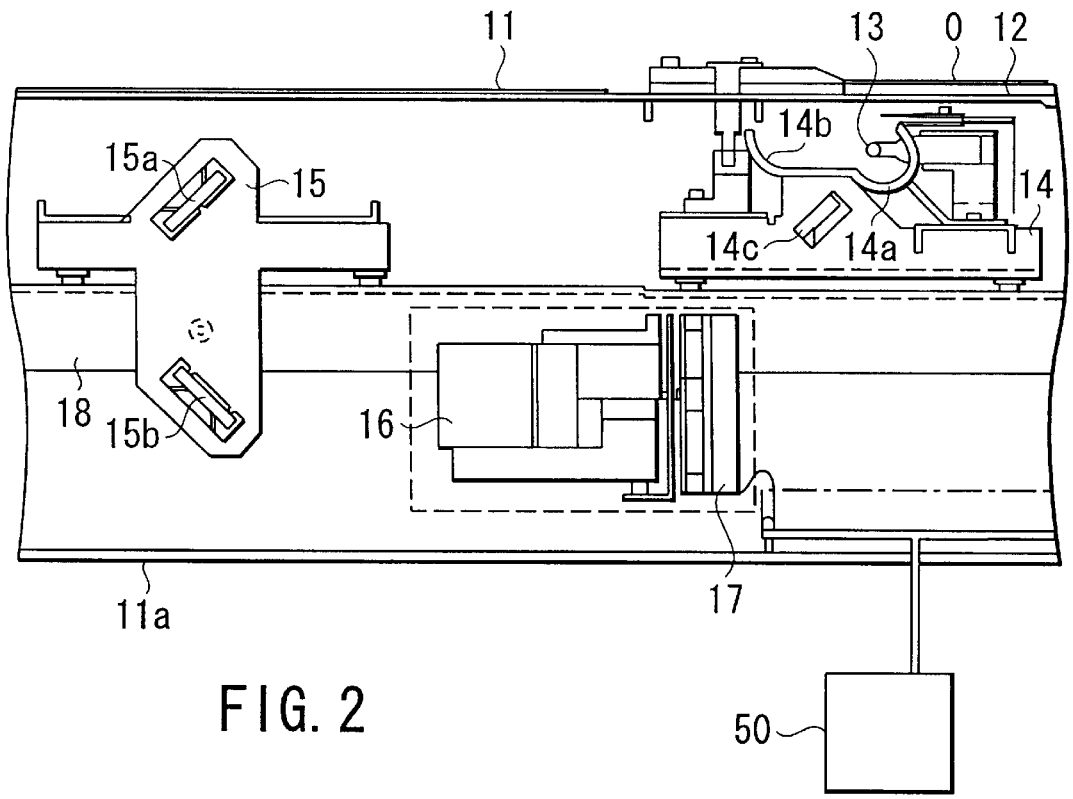
FIG. 2 is a schematic diagram showing the main section of the image reader incorporated to the image forming apparatus shown in FIG. 1.

FIG. 2 is a schematic diagram for describing one example of a color image reader (scanner) incorporated into a color image forming apparatus shown in FIG. 1.

As shown in FIG. 2, the color image reader 11 has an original table 12 for holding an original O which is a subject to be read (copied) which formed with the material such as glass that transmits light and is a rectangular plane material in the form of plates with four sides, a lighting lamp 13 for illuminating the original O located on the original table 12, a first carriage 14 that has the first image mirror 14c for holding the lighting lamp 13 and at the same time guiding the reflected light from the illuminated original O by the lighting lamp 13 to the predetermined direction, a second carriage 15 that has the second image mirror 15a and the third image mirror 15b for guiding the reflected light from the original O reflected by the first image mirror 14c of the first carriage 14 to the predetermined direction, a reducing lens 16 that gives the predetermined reduction magnification to the reflected light from the original O guided to the second carriage 15, a 3-line color CCD sensor 17 for receiving the reflected light from the original O reduced to a predetermined magnification by the reducing lens 6 and photoelectrically converting to output the image information signal corresponding to the image of the original O, and a rail 18 that movably supports the first and the second carriages 14, 15 along the original table 12.

When a first carriage 14 is positioned at the home position close to the tip end of the original O in the vicinity of one end portion of the original table 12, at the position illuminated by the lighting lamp 13 of the first carriage 14 and reflection plates 14a, 14b, a white reference plate 19 used for correcting the threshold level of the sensitivity of the CCD sensor 17 or for the CCD sensor 17 to identify the image of the original O into a white image and a black image is installed.

Figure 3:
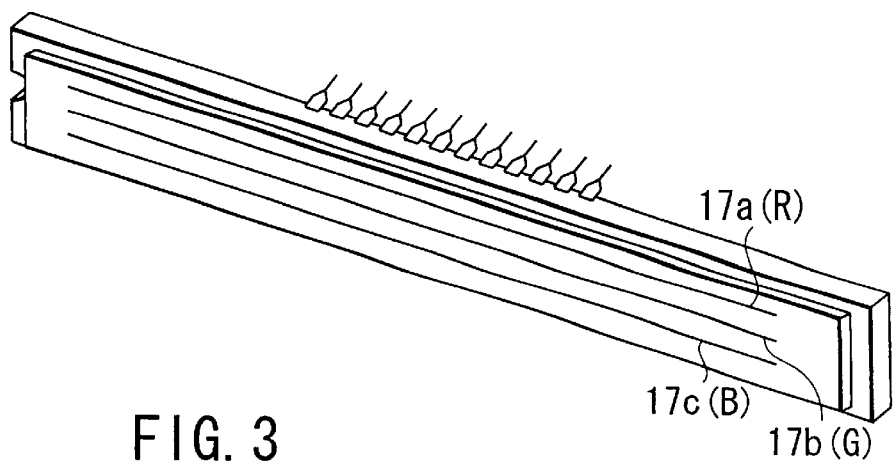
FIG. 3 is a schematic diagram showing a 3-line CCD sensor incorporated into the image reader shown in FIGS. 1 and 2.

FIG. 3 is a schematic diagram for describing the configuration of the 3-line CCD sensor of the color image reader shown in FIG. 2.

The 3-line CCD sensor 17 has a light receiving surface with three line sensors 17a, 17b, and 17c arranged in parallel to one another for decomposing the image of the original O into three color component images of R (red), G (green), and B (blue) in conformity to the additive primary, and is fixed in such a manner that the line sensor 17b located at the center intersects with the optical axis of the reducing lens 16. Consequently, at each of the three line sensors 17a (R), 17b (G), and 17c (B), the reading position of the original O read at the same time differs at each interval where each line sensor is located. By the way, in the CCD sensor 17, the intervals between the R line sensor 17a and the G line sensor 17b (center-to-center distance) and the intervals between the G line sensor 17b and B line sensor 17c (center-to-center distance) are set to, for example, 64 μm, respectively. Consequently, the intervals between the R line sensor 17a and the B line sensor 17c (center-to-center distance) is 128 μm. Each of the line sensors 17a (R), 17b (G), and 17c (B) are equipped with a red (R) filter, green (G) filter, and blue (B) filter which are primary color based filters, which output image signals for each color component of R, G, and B.

Figure 4:
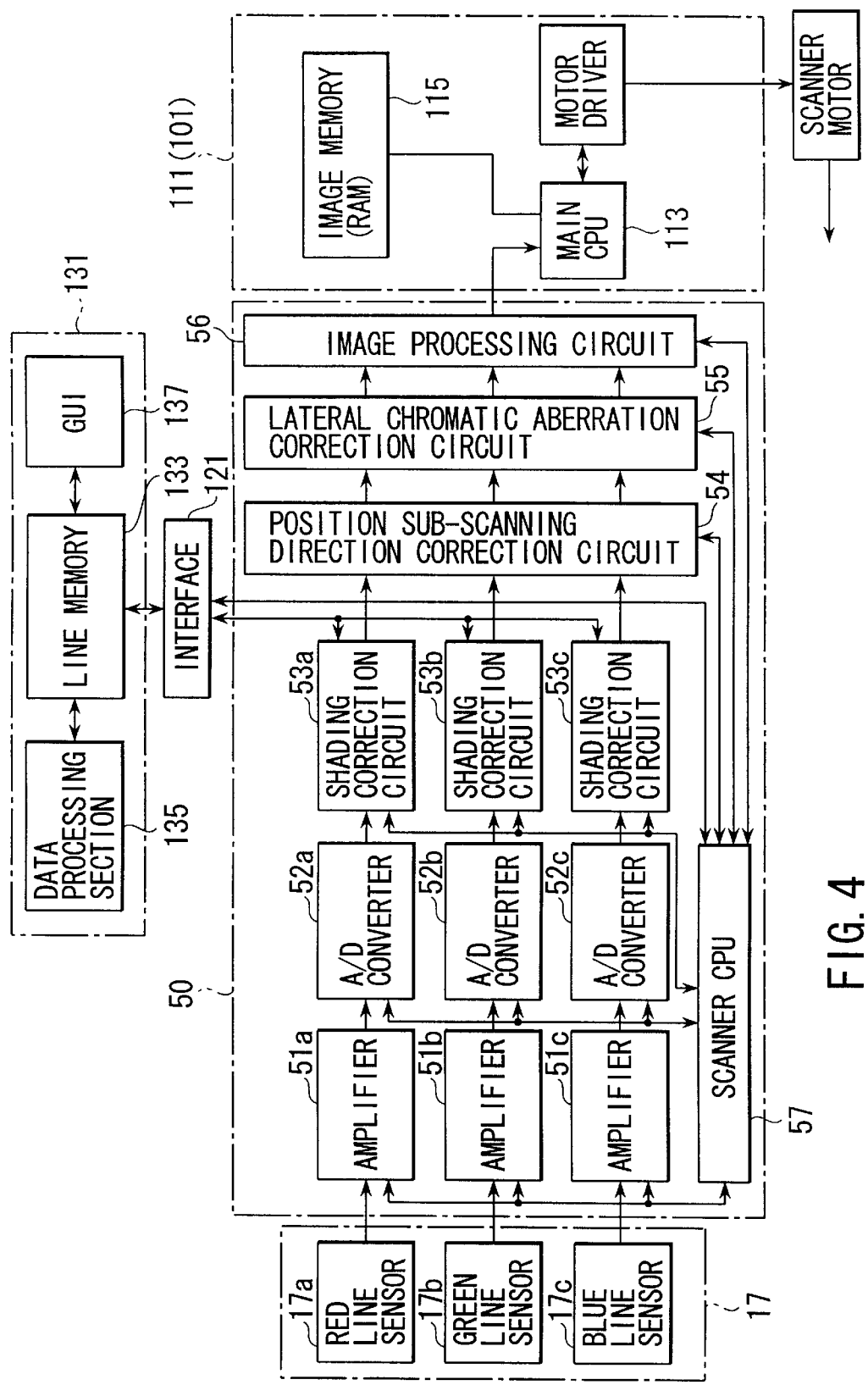
FIG. 4 is a block diagram showing an example of an image processing circuit for processing obtained image signals outputted from the 3-line CCD sensor shown in FIGS. 2 and 3 and generating output image signals for forming images in the image forming apparatus shown in FIG. 1.

FIG. 4 is a block diagram describing one example of the image processing circuit which processes the obtained color signals outputted from the 3-line CCD senor shown in FIGS. 2, 3 and generates output image signals for forming images in the image forming apparatus shown in FIG. 1.

The image signals (line sensor outputs) outputted from R line sensor 17a, G line sensor 17b, and B line sensor 17c of the 3-line CCD sensor 17, respectively, are inputted to amplifiers 51a, 51b, and 51c of the image signal processing section 50, respectively, and amplified to the predetermined level by the control of the scanner CPU 57.

The outputs from the respective line sensors 17a, 17b, and 17c amplified at the individual amplifiers 51a, 51b, and 51c are converted to digital signals by the A/D converters 52a, 52b, and 52c that correspond (to each of them by the control of the scanner CPU 57), inputted to shading correction circuits 53a, 53b, and 53c that correspond (to each of them by the control of the scanner CPU 57), have the white level and black level reference values corrected in accordance with the threshold level set on the basis of the reflected light from the white reference plate 19 in advance, and inputted to the position sub-scanning direction correction circuit 54 on the next stage.

The image signal inputted to the position sub-scanning direction correction circuit 54 has deviation of the position to read the original (at the same time) in the sub-scanning direction when the original is read by each line sensor 17a, 17b, and 17c corrected by the control of the scanner CPU 57, and outputted to the lateral chromatic aberration correction circuit 55 on the next stage.

The image signal entered in the lateral chromatic aberration correction circuit 55 has the influence of the lateral chromatic aberration exerted in accordance with the color components by the arrangement of each line sensor (17a, 17b, and 17c) of the CCD sensor 17 and the reducing lens 16 corrected by the control of scanner CPU 57, and inputted in the image processing circuit 56 on the next stage. Specifically, the lateral chromatic aberration correction circuit 55 includes a delay memory 55-1 for providing the predetermined delay to each of a sensor 17a (R image signal), sensor 17b (G image signal), and sensor 17c (B image signal), a lateral chromatic aberration correction section 55-2 for providing a predetermined correction to the image signals outputted from the sensor 17a and the sensor 17c with the output of the sensor 17b (G) located at the center in the line CCD sensor 17 as a reference and amplified previously, and the correction data memory (ROM) 55-3, receives the correction coefficient parameters which can be optionally changed in accordance with the input from the adjustment operator by the correction coefficient parameter generator unit 131 discussed below and are set by the operation of the adjustment engineer, corrects the positional deviation of, for example, R image signals and B image signals with respect to G image signals, and outputs them to the mage processing circuit 56.

The image processing circuit 56 carries out, for example, color correction (change of color balance) or concentration correction for the image signal from the lateral chromatic aberration correction circuit 55 by the control of the scanner CPU 57, and outputs the output image signal for each image forming section of the image forming apparatus 101 to form the image of each color component. The output image signal outputted from the image processing circuit 56 is held to, for example, image memory (RAM) or buffer memory 115 by the control of the main CPU 113 of the main control board 111 of the image forming apparatus 101.

Figure 5:
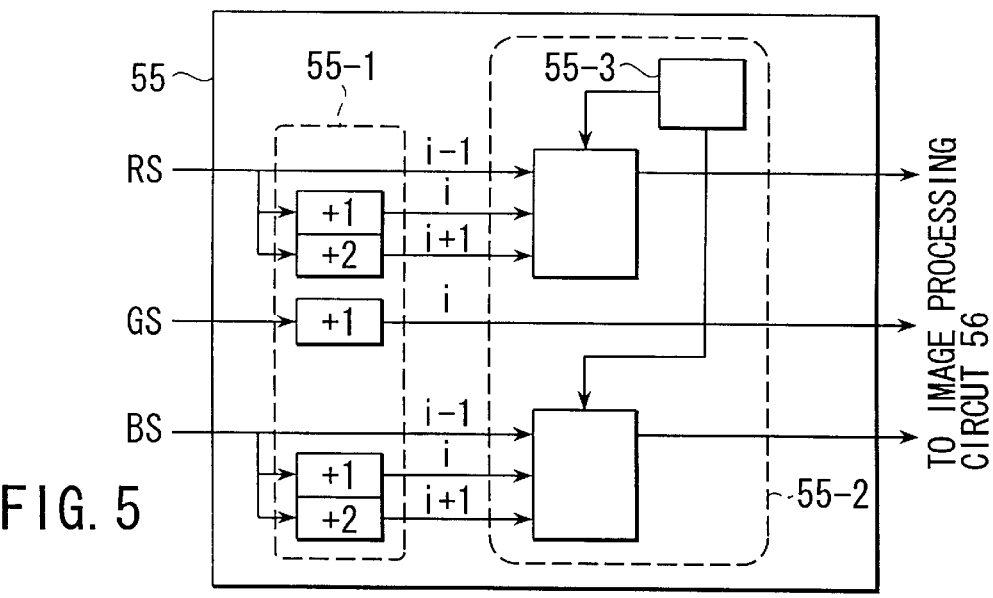
FIG. 5 is a block diagram showing an example of the circuit of lateral chromatic aberration correction section incorporated into the image processing circuit of the image reader described by the use of FIG. 4.

On the other hand, the output of the position sub-scanning direction correction circuit 54 is supplied to the correction parameter generating unit 131 connected to the position sub-scanning direction correction circuit 54 via an interface 121 as described in the latter part using FIG. 5 (proposal 9) (before correction for the lateral chromatic aberration by the lateral chromatic aberration correction circuit 55), which includes the line memory 133 that can hold image data from sensors 17a, 17b, and 17c obtained by at least one reading by the 3-line sensor 17, and a data processing section 135 for performing specific arithmetic later described in the latter part on the data held to the memory 133, and performs specific arithmetic later described on output images from the three line sensors and generates the correction coefficient parameter. The predetermined processing to the image data from each line sensor temporarily stored in the line memory 133 is optionally set by the adjustment operator via GUI (graphical user interface, which contains the window system, imaging system, application program interface and the like, and is an interface that allows the users to interact with the computer via pictographs, icons and the like, displayed on the screen) 137 connected to the data processing section 135.

Now, discussion will be made on the action of the color image reader 11.

First, the first carriage 14 is located at the home position, the lighting lamp 13 is lighted in the predetermined timing, and based on the reflected light from the white reference plate 19, the threshold level and sensitivity of the 3-line color CCD sensor 17 are calibrated.

The image of the original (subject) O passes in a slit-form space defined between two reflecting plates 14a, 14b as image light containing the reflected light from the original O illuminated by the lighting lamp 13 and reflection plates 14a, 14b as a contrast of the light, and is guided to the first image mirror 14c of the first carriage 14.

By the way, since the lighting lamp 13, reflection plates 14a, 14b, and the first image mirror 14c are formed in an elongated form along one side of the original table 12, the image light guided to the first image mirror 14c through the slit-form space is of a band form along one side of the original table 12. In addition, the direction to which this band-form region is extended is generally called the main scanning direction.

The image light guided to the first image mirror 14c is reflected to the second image mirror 15a, and the image light that reaches the second image mirror 15a is further reflected to the third image mirror 15b.

The image light guided to the third image mirror 15b is reflected to the reducing lens 16, reduced to a predetermined magnification by the reducing lens 16, and impinges on the light receiving surface of the 3-line CCD sensor 17.

Then, moving both carriages 14, 15 on the rail 18 along the original table 12 at a speed that is ½ the speed of the first carriage 14 and the second carriage 15 being moved by a motor not illustrated causes the image light reflected from the original O to be guided successively by the 3-line CCD sensor 17 for each of band-form regions in the direction intersecting the direction at right angles in which the first and the second carriages 14, 15 are moved. The direction in which the first and the second carriages 14, 15 are moved is generally called the sub-scanning direction.

With this configuration, the image information of the original O is converted into color image signals by each line sensor 17a, 17b, and 17c of the 3-line CCD sensor 17.

Figure 6:
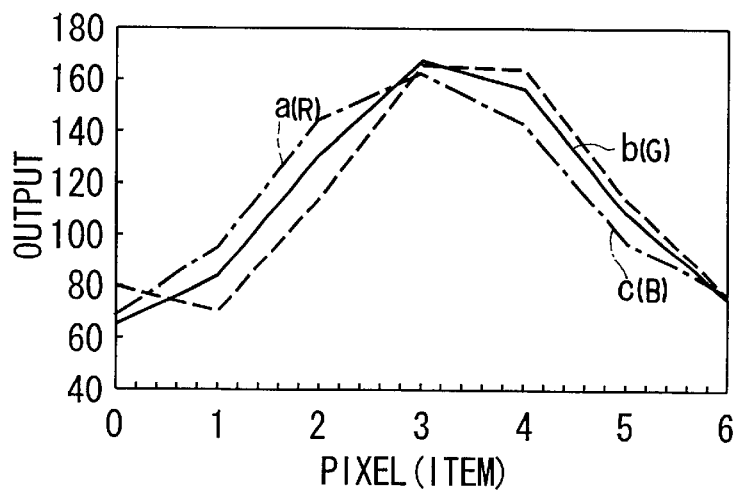
FIG. 6 is a graph showing the magnitude of deviation for each color component of the image read by the image reader with a predetermined reading resolution.

By the way, as described before, when the 3-line color CCD sensor 17 is used, the R line sensor 17a and the B line sensor 17c are located at positions different in the sub-scanning direction with respect to the G line sensor 17b located on the optical axis of the reducing lens 16, the output signals from each line sensor 17a, 17b, and 17c of the 3-line color CCD sensor 17 with the threshold level set at the shading correction circuits 53a, 53b, and 53c, amplified at amplifiers 51a, 51b, and 51c and converted to digital signals by A/D converters 52a, 52b, and 52c have the peak position deviated and output distribution not superimposed between signals R, G, and B in spite of reading black lines at the same position between signals R, G, and B as shown in FIG. 6 (proposal 4).

Figure 7:
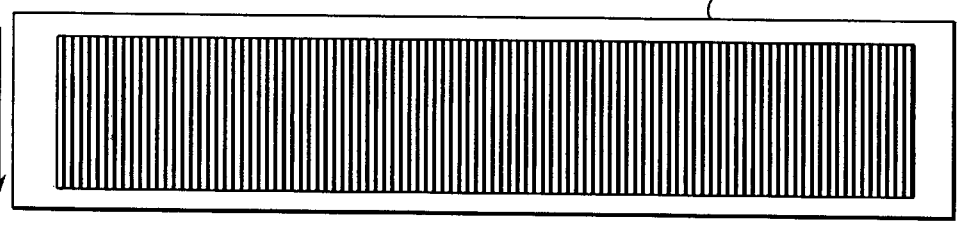
FIG. 7 is a schematic diagram showing an example of chart image which can capture deviation for each color component in the image signal read by the image reader.

FIG. 6 is a graph showing an example of the output level when the black fine line extending in the sub-scanning direction as shown in FIG. 7 (proposal 7) is read by using the color image reader whose reading resolution is 600 dpi (dots per inch). The abscissa normalizes the pixel position in the main scanning direction and the ordinate the sensor output in the pixel by 256 gray scales with white designated to 0 and black to 255. In FIG. 6, the curve a shows the R line sensor output, the curve b the G line sensor output, and the curve c the B line sensor output, respectively. In this example, it is recognized that positional deviation of about 0.8 pixel at maximum is generated from "the total of Dr which is a deviation of R with respect to G and Db which is a deviation of B with respect to G." By the way, even when the positional deviation amount is traces, which are smaller than the pixel size, the difference is great from the viewpoint of the sensor output; for example, in the second pixel of the graph, difference of output level between R and B reaches 30 (256). This indicates that in the black line edge section, output balance of each line sensor is broken greatly, and it becomes unable to recognize the black, and coloring (color ghost) is generated at the black-line edge section.

Lateral chromatic aberration is, in general, increased and decreased by the performance and a method of combinations of individual lenses included in the reducing lens 16 comprising combinations of a plurality of lenses, but optical correction has its own limits due to restraint of costs, and the like.

Consequently, in the image signal processing section of the present invention shown in FIG. 4, the output signals from the shading correction circuits 53a, 53b, and 53c have their position sub-scanning direction corrected by the position sub-scanning direction correction circuit 54 and the phase of the image signal of three color components are adjusted.

The lateral chromatic aberration correction circuit 55 generally finds, for example, the load average of adjacent pixels, and when the deviation as shown in FIG. 6 exists, for the deviation DR between R and G with G as a center, the lateral chromatic aberration correction circuit 55 is the circuit for correcting the respective positional deviations with respect to G by correcting the R signal output of the i-th pixel: Ri in accordance with the following equation:

$$Ri\ new = (n+1-D_R) \times Ri+n + (R-n) \times Ri+n+1$$

where, n is an integer that satisfies $n \leq D_R < n+1$

Ri new is Ri after correction          Equation (1)

and for the deviation $D_B$ between B and G with G as a center, the B signal output of the i-th pixel: Bi in accordance with the following equation:

$$Bi_{new} = (n+1-D_B) \times Bi + n + (DB-n) \times n+1$$

where, n is an integer that satisfies $n \leq D_B < n+1$ $Bi$ new is $Bi$ after correction              Equation (2).

By the way, in Equation (1) and Equation (2), the positional deviation amounts Dr, Db are able to be expressed, respectively, by the deviation amount Bi which is deviated from the pixel at the i-th position of G image and Bi−1 of B image which is deviated with respect to the pixel at the (i−1)th position of G image when there is an output of B image signal which is deviated by the predetermined amount with respect to the output of the G image signal, and the position of the i-th pixel is located at the (i−1−$D_B$) with respect to the original position of the i-th image and is expressed by (i−1+$D_B$) with respect to the original position of the (i−1)th image, respectively. With these, the correction coefficient parameters $K_R$, $K_B$, $L_R$, and $L_B$ can be found.

Figure 8:
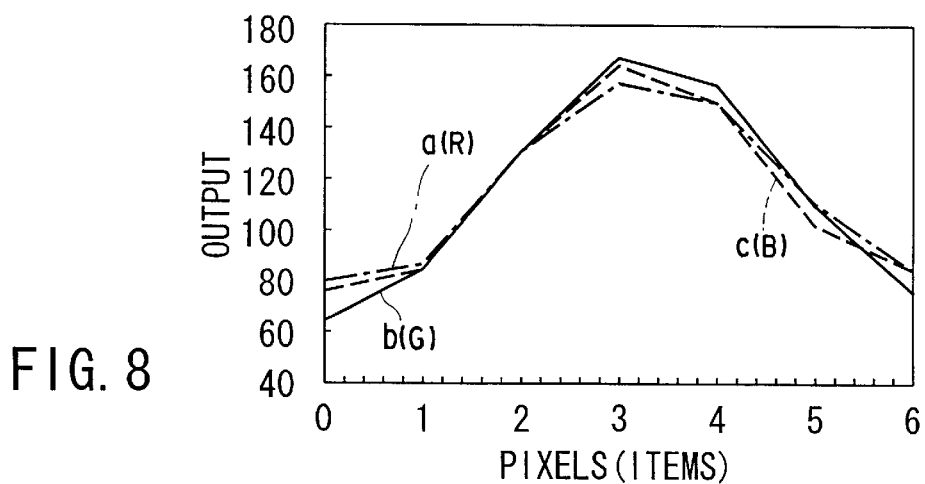
FIG. 8 is a graph showing the condition of the improved magnitude of color component deviation shown in FIG. 6.

FIG. 8 (proposal 5) shows one example of the results of correcting respective positional deviations by applying Equation (1) and Equation (2) to each output of R line sensor and B line sensor with respect to the G line sensor output shown in FIG. 6. In FIG. 8, the curve a shows the R line sensor output, the curve b the G line sensor output, and the curve c the B line sensor output, respectively.

As is clear from FIG. 8, it is recognized that the positional deviations of image signals outputted from the individual line sensors 17a, 17b, and 17c have been eliminated in the range of pixel value from one pixel to two pixel. The correction of the above-mentioned positional deviations is described with the pattern of black fine line on the white background taken as an example, the pattern of white fine line with the lack background can be utilized if it is the pattern where R, G, and B line sensors indicate sensitivity. In addition, the line sensor to be a reference is not necessarily the G line sensor, but any of R line sensor and B line sensor may be used for the reference.

Now, it is easily understood from Equation (1) and Equation (2), in order to correct the positional deviation of image signals outputted from each line sensor at high accuracy, it is necessary to weight adjacent pixels, and consequently, the positional deviation amount smaller than the minimum one pixel size must be measured. In addition, because lateral chromatic aberration is also varied by the image height (main scanning position), when the positional deviation amount is measured, it is necessary to measure throughout the whole area in the main scanning direction. For example, the maximum reading positional deviation amount between R, G, and B resulting from lateral chromatic aberration in the main scanning direction in the general color image reader as shown in FIG. 9 (proposal 6) contains a large undulation generally corresponding to 0.35 pixels for the whole area in the main scanning direction and the width about 0.1 pixel at individual positions in the main scanning direction when abscissa denotes the position in the main scanning direction (unit: number of pixels/10) and ordinate denotes the maximum positional deviation amount between R, G, and B (unit: number of pixels).

Consequently, it is desirable to measure the positional deviation amount smaller than the minimum size of one pixel by the use of the following method in addition to weighting adjacent pixels found by Equation (1) and Equation (2).

Figure 9:
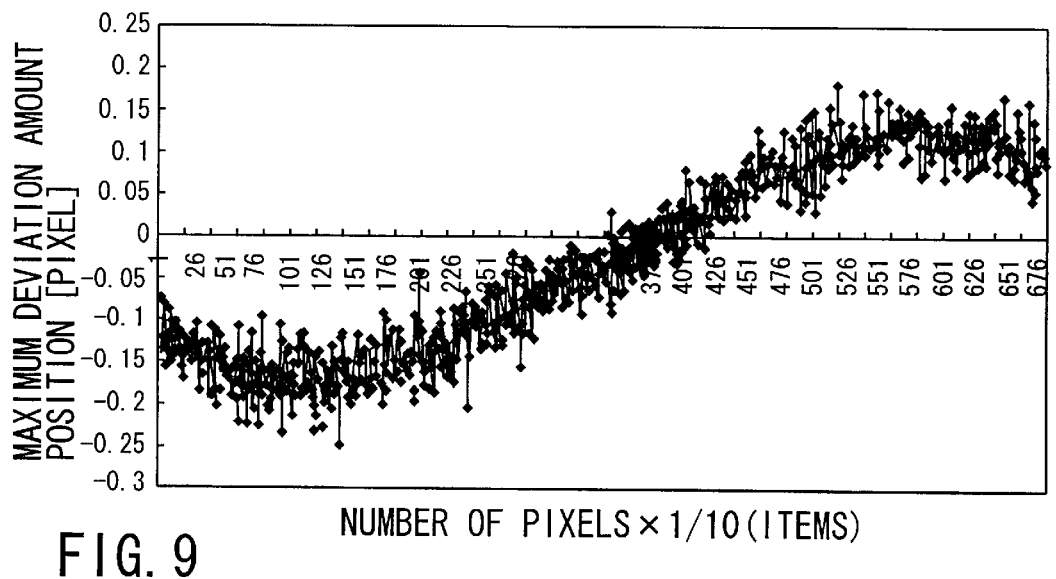
FIG. 9 is a graph showing the deviation for each component shown in FIG. 6 with respect to the whole area in the main scanning direction.

The results shown in FIG. 9 is nothing but to measure the positional deviation amount smaller than the minimum size of one pixel according to the present invention described above, but since reading the image of the chart with images similar to the black and white pair line image as shown in FIG. 7, finding the color deviation amount from the intersection between the "Mansen" data read and the predetermined threshold value, and then, interpolating them and preparing a color deviation amount table corresponding to each pixel position, and correcting the color deviation of the noted pixel by correlating the color deviation amount table with the image data of the pixels in the vicinity of then noted pixel (position of the noted pixel on the color deviation amount table) is analogous to the method disclosed in Jpn. Pat. Appln. KOKAI Publication No. 10-42157 described in the column "Disclosure of Related Art," there is a problem of greatly varied calculation results when the output data before and after the two pixels is affected by noise because the positional deviation amount is found only by the two pixels before and after the predetermined threshold value as already explained.

The present invention finds the position of the center of balance of the output distribution of output signals from individual line sensors corresponding to black and white pair lines obtained by reading the image of the "Mansen" original described above, calculates the positional deviation of the center of balance, and corrects the positional deviation of the output signal. By the way, because in order to find the position of the center of balance of the output distribution of the output signal from each line sensor, the output data of all the points obtained by reading the black and white pair line image with the CCD sensor are utilized, it is evident that the results are difficult to be susceptible to noise.

More specifically, in the output signal distribution shown in FIG. 6, when the output distribution of one pair of black and white pair line is formed with points from jth pixel to kth pixel (in FIG. 6, j=0, k=6), the position of the center of balance $P_R$ of signal R is given by $$P_R = \Sigma(Ri \times i)/\Sigma Ri \ (i=j \text{ to } k) \tag{3}$$

Similarly, the position $P_G$ of the center of balance of signal G and the position $P_B$ of signal B is given by $$P_G = \Sigma(Gi \times i)/\Sigma Gi \ (i=j \text{ to } k) \tag{4},$$

and $$P_B = \Sigma(Bi \times i)/\Sigma Bi \ (i=j \text{ to } k) \tag{5}$$

where, j, k may differ in accordance with each color.

From Equation (3) to Equation (5), the positional deviation amounts $D_R$ and $D_B$ between R and G and between B and G are given as follows with respect to the positions of center of balance $P_R$, $P_G$ and $P_B$.

$$D_R = P_R - P_G \tag{6}$$

$$D_B = P_B - P_G \tag{7}$$

However, as described above, when the position of center of balance of the output distribution of the output signal from each line sensor is found and the positional deviation amounts $D_R$, $D_B$ between R and G and between B and G are found, from the well-known Shannon's sampling theorem (a theorem expressing that when there is a signal that continuously changes with respect to time, if the sample values of the signal are taken at equal intervals at the time corresponding to the frequency more than double that of the maximum frequency component contained in this signal, the original signal can be completely determined only with these sample values), the cycle required for the cycle of the black and white pair line is more than twice the pixel intervals that the 3-line CCD sensor has, and it is therefore unable to calculate the positional deviation amount simultaneously at all the pixel position. That is, in the example described referring to FIG. 6, the cycle of the black and white pair line is generally 7 pixels, and consequently, the position of center of balance to be found is limited to every seven pixels. Consequently, in order to find the positional deviation amount at all the pixel position, the deviation amount from the measuring point to the remaining pixel position must be interpolated or the position of Chart MS set to the original tale 12 must be deviated in the sub-scanning direction to find the new data.

Figure 10:
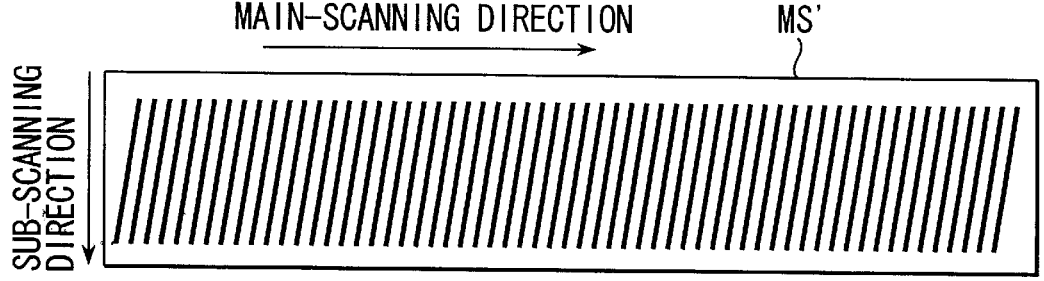
FIG. 10 is a schematic diagram showing an example of chart image which can detect deviation for each color component from one pixel to the other in the image signal read in place of the chart shown in FIG. 7.
Figure 11A:
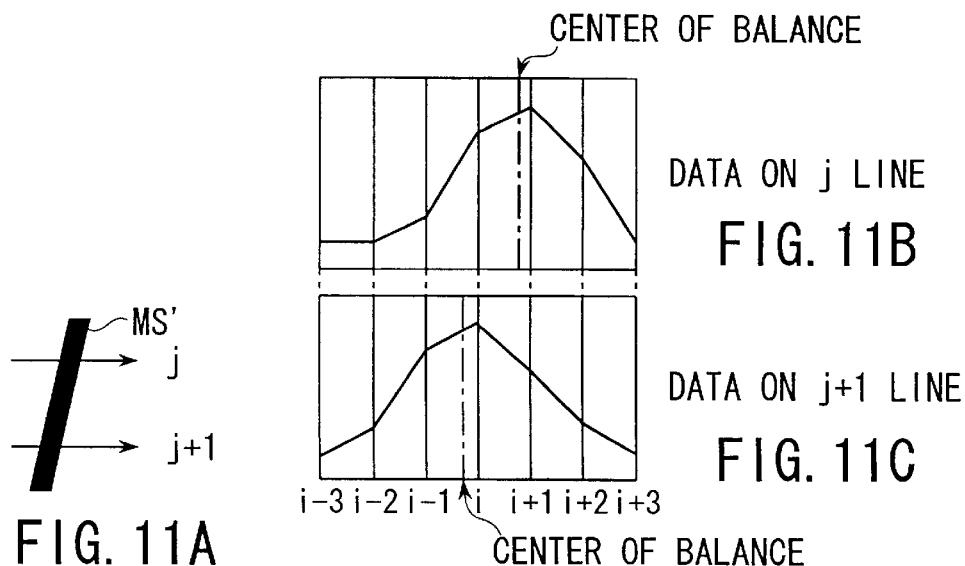
FIG. 11A is a schematic diagram showing the relationship between the gradient of the chart image shown in FIG. 10 and read timing in the sub-scanning direction at the time of reading by the image reader.
Figure 12:
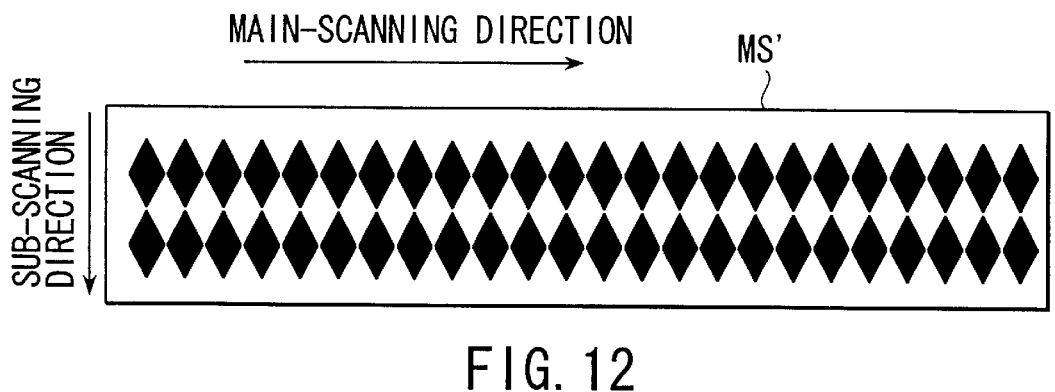
FIG. 12 is a schematic diagram showing an example of the chart image that can detect deviation for each color component from one pixel to the other in the image signal read in place of the chart shown in FIG. 7.

In the case of interpolating the deviation amount, because as the number of samples increases, interpolation with higher accuracy is enabled, for example, as in the case of Chart MS' shown in FIG. 10 (proposal 10), it is possible to find the positional deviation amount at all the pixel positions by reading images of a plurality of lines in one reading using the chart of the pair line with a gradient with respect to the sub-scanning direction. This indicates that because as shown in FIG. 11A (proposal 11), as Chart MS' is shown with j, j+1, j+2, ... , reading in the sub-scanning direction several times causes the appearance position of the same black line (white line) to deviate successively in the main scanning direction, the position deviation measuring point can be moved without changing the position of Chart MS'. That is, for example, in the line "j," the image with the center of balance located at the position of center of balance as shown in FIG. 11B is obtained, and in the line "j+1," as shown in FIG. 1C, the image with the center of balance located at the position of center of balance deviated, for example, to the "negative" side in the main scanning direction can be obtained. In the chart shown in FIG. 10, because when the pair line gradient is 45°, the moving amount of the next measurable point on the line corresponds to 1 pixel, the positional deviation amount of all the pixels can be found from the data on the f-th line which is the same as the cycle f pixel of pair line. Consequently, the use of the chart in which a plurality of fine line images at the angle 45° with respect to the sub-scanning direction can shorten the time required for finding the center of balance. For the chart that can be used, the image with diagonal lines intersecting at optional angles gathering as represented by lattice patterns, and the like where a plurality of parallelograms are arranged, in which the respective length of the four sides are equal and adjoining sides are located on the same straight line for example, as in the case of the chart MS" shown in FIG. 12, is used and the intersection with respect to the predetermined threshold value is extracted as the edge information to find the positional deviation amount.

Now, as distributions of the positional deviation amount with respect to the main scanning direction indicate similar profiles between image readers fabricated under the same design criteria, they can be approximated by functions. In such event, since the positional deviation amount at an optional position is able to be found by an approximation formula obtained from measured data, it is only needed to store several parameters expressing the approximation formula and there is no need for storing all the positional deviation amounts at all pixels, and the capacity of the storage memory for storing the positional deviation amount can be greatly reduced.

Figures 13A, 13B, 13C:
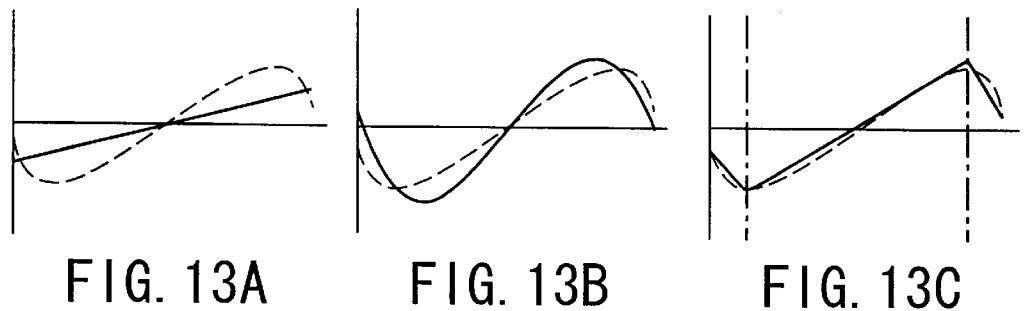
FIGS. 13A to 13C are schematic diagrams showing the approximation formulae (approximation curves) that approximate deviation for each color component shown in FIG. 9.

For example, in the image reader with the positional deviation amount distribution of a pattern as shown in FIG. 9 (proposal 6), the positional deviation amount distribution is able to be approximated by any of the forms of linear expression as shown in FIG. 13A, the cubic expression as shown in FIG. 13B, three straight lines as shown in FIG. 13C and the like.

For example, because if the linear expression shown in FIG. 13A is used, the positional deviation amount of signal R and signal B ($D_R$ and $D_B$) as seen from signal G in each pixel position i can be expressed by $$D_R = K_R \times i + L_R$$

$$D_B = K_B \times i + L_B,$$

since a memory that can store four parameters only ($K_R$, $L_R$, $K_B$ and $L_B$) should be prepared. If the distribution profile of positional deviation amounts has already been confirmed, there is no need to find the positional deviation amount with respect to all the pixel positions, and the data should be acquired with characteristic positions (maximum value, minimum value, both ends, at the center, or in the vicinity of these, and the like) only.

Finding the positional deviation amount at various pixel positions as described above and interpolating the positional deviation amount between pixels which are smaller than one pixel using the positional deviation amount determined can be achieved by the use of correction coefficient parameters supplied from the correction coefficient parameter generator unit 131 to the lateral chromatic aberration correction circuit 55 described above referring to FIG. 4. The correction coefficient parameter generator unit 131 provides the predetermined processing (arithmetic) at the data processing section 135 in accordance with the input of the GUI 137 to the output signals from each of the sensors 17a, 17b, and 17c of the 3-line CCD sensor 17 stored in the line memory 133 to generate the correction coefficient parameter and supplies to the correction data memory 55-3 of the lateral chromatic aberration correction circuit as shown in FIG. 4. The lateral chromatic aberration correction circuit 55-2 uses the correction coefficient parameters inputted to the correction data memory 55-3 and corrects the results with the predetermined delay given to at least R image signal and B image signal by the delay memory 55-1 in such a manner that the positional deviation is eliminated.

For example, if a chart MS of black and white pair line with black and white fine lines formed alternately (on white paper, for example, 0.2-mm-wide black lines are arranged at 0.2 mm intervals) as shown in FIG. 7 is set to the original table 12 of the image reader 11, the lateral chromatic aberration correction section 55-2 receives the R image signal, G image signal, and B image signal which are output signals from the line sensors 17a, 17b, and 17c, respectively, of the 3-line color CCD sensor corresponding to chart MS, and corrects the original output signal using the results of providing the predetermined delay to the R image signal and B image signal by the delay memory 55-1 as well as the correction coefficient parameters held in the correction data memory 55-3.

In this way, the positional deviation amount corrected on the basis of the correction coefficient parameters at the lateral chromatic aberration correction section 55-2 is inputted to the image processing circuit 56 on the next stage by the control of the scanner CPU 57, and by the control of the scanner CPU 57, for example, color correction (change of color balance) or concentration correction is provided, and as an output image signal for each image forming section of the image forming apparatus 101 to form an image for each color component, they are stored in, for example, the image memory (RAM) or the buffer memory 115 by the control of the main CPU 113 of the main control board 111 of the image forming section 101.

By the way, the data processing section 135 of the correction coefficient parameter generator unit 131 finds the positions of centers of balance $P_R$, $P_G$ and $P_B$ in each color for every 10 pixels (black-and-white pair line width when resolution is 600 dpi) which are intervals of black-and white pair lines, in conformity to Equation (3), Equation (4), and Equation (5) described above by the use of the weighted mean from the image data stored in the line memory 133 by the data processing section 135, and then, finds the reading position deviation amount $D_R$, $D_B$ between R and G as well as between G and B from Equation (6) and Equation (7).

Then, based on the position deviation amount calculated for every 10 pixels, the relationship between the pixel position i and the position deviation amounts $D_R$ and $D_B$, respectively, is approximated by the following linear expressions described as above referring, for example, to FIG. 12A $$D_R = K_R \times i + L_R$$

$$D_B = K_B \times i + L_B$$

and these $K_R$, $K_B$, $L_R$ and $L_B$ found are transferred to the correction data memory 55-3 of the lateral chromatic aberration correction circuit 55 as correction coefficient parameters.

Figure 14:
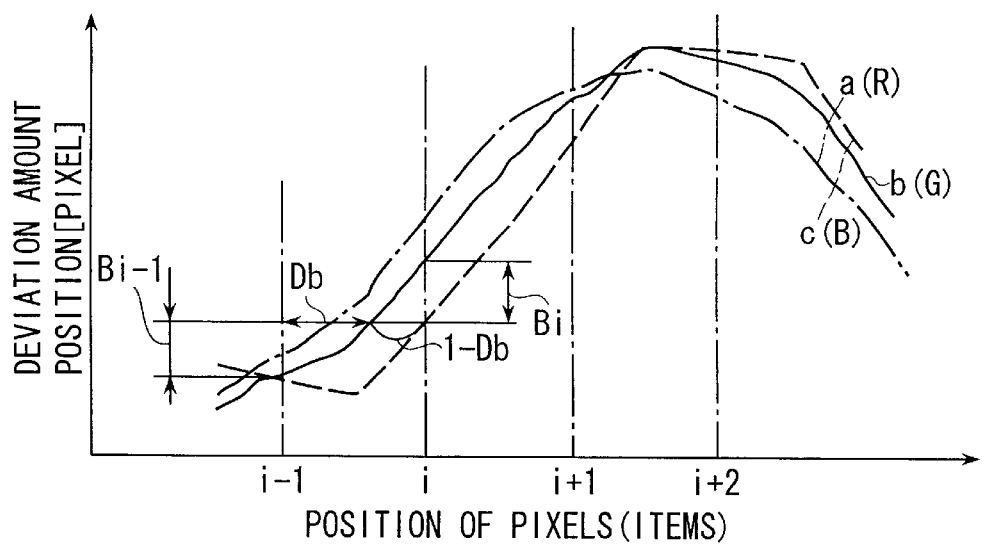
FIG. 14 is a schematic diagram showing a method for finding deviation of each color component from the output image signals from individual line sensors in the lateral chromatic aberration correction circuit shown in FIG. 5.

Each of the correction coefficient parameters described above is determined by the method of least squares as shown in, for example, FIG. 14.

As shown in FIG. 14, each correction coefficient parameter is set so that min ($\Sigma_i \Delta Di2$) holds for, when Di' denotes the measured value, Di the approximated value, and $\Delta Di$ ($\Delta Di = Di - Di'$) so that the difference (error) from the results (approximated value) found by the measured data and the approximation formula with respect to optional parameters become minimum.

Now, the correction coefficient in each pixel position is deduced from the correction coefficient parameters found in accordance with the rule described above, and the position deviation is corrected in conformity to Equations (1) and (2).

That is, for $R_S$ that corresponds to the R image signal generating positional deviation in the sub-scanning direction with respect to G at the position of three output signals outputted from the position sub-scanning correction circuit 54, and $B_S$ corresponding to the B image signal of the same, the data for a total of 3 pixels of the i-th pixel to be corrected, (i−1)th and (i+1)th pixels before and after the i-th pixel is generated by the delay memory 55-1, and at the lateral chromatic aberration correction section 55-2, the pixel data (i) are multiplied by the correction coefficients ($K_R$, $K_B$), to which the correction coefficients ($L_R$, $L_B$) are further added in conformity of $D_R = K_R \times i + L_R$ and $D_B = K_B \times i + L_B$.

Figure 15:
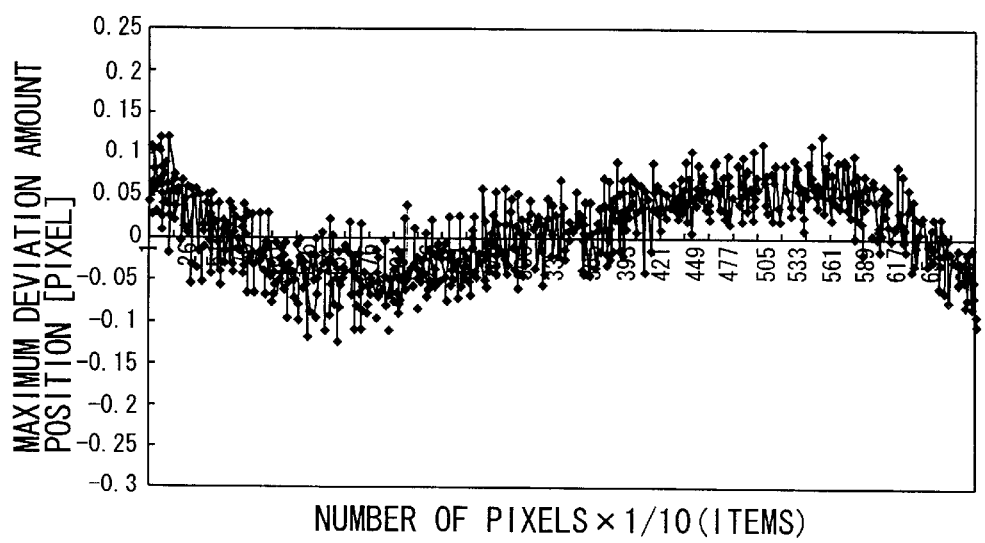
FIG. 15 is a graph showing the magnitude of improved deviation for each color component throughout the whole area in the main scanning direction shown in FIG. 9.

By this operation, the respective position deviation amounts of R output signal outputted from the R line sensor 17a and B output signal outputted from the B line sensor 17c with respect to the G output signal outputted from the G line sensor 17b of the 3-line CCD sensor 17, can be suppressed to a very small range as shown in FIG. 15.

In this way, the image signals of each color with the original reading position deviation corrected in the sub-scanning direction (at the same time) when the data is read by the line sensor 17a, 17b, and 17c, respectively are inputted to the image processing circuit 56 of the next stage by the control of the scanner CPU 57. The image signal inputted to the image processing circuit 56 has, for example, color correction (change of color balance) and concentration corrected by the control of the scanner CPU 57, and is held in the image memory (RAM) or the buffer memory 115 by the control of the main CPU 113 of the main control board 111 of the image forming section 101 as the output image signal for each image forming section of the image forming apparatus 101 to form images for each color component.

Figure 16:
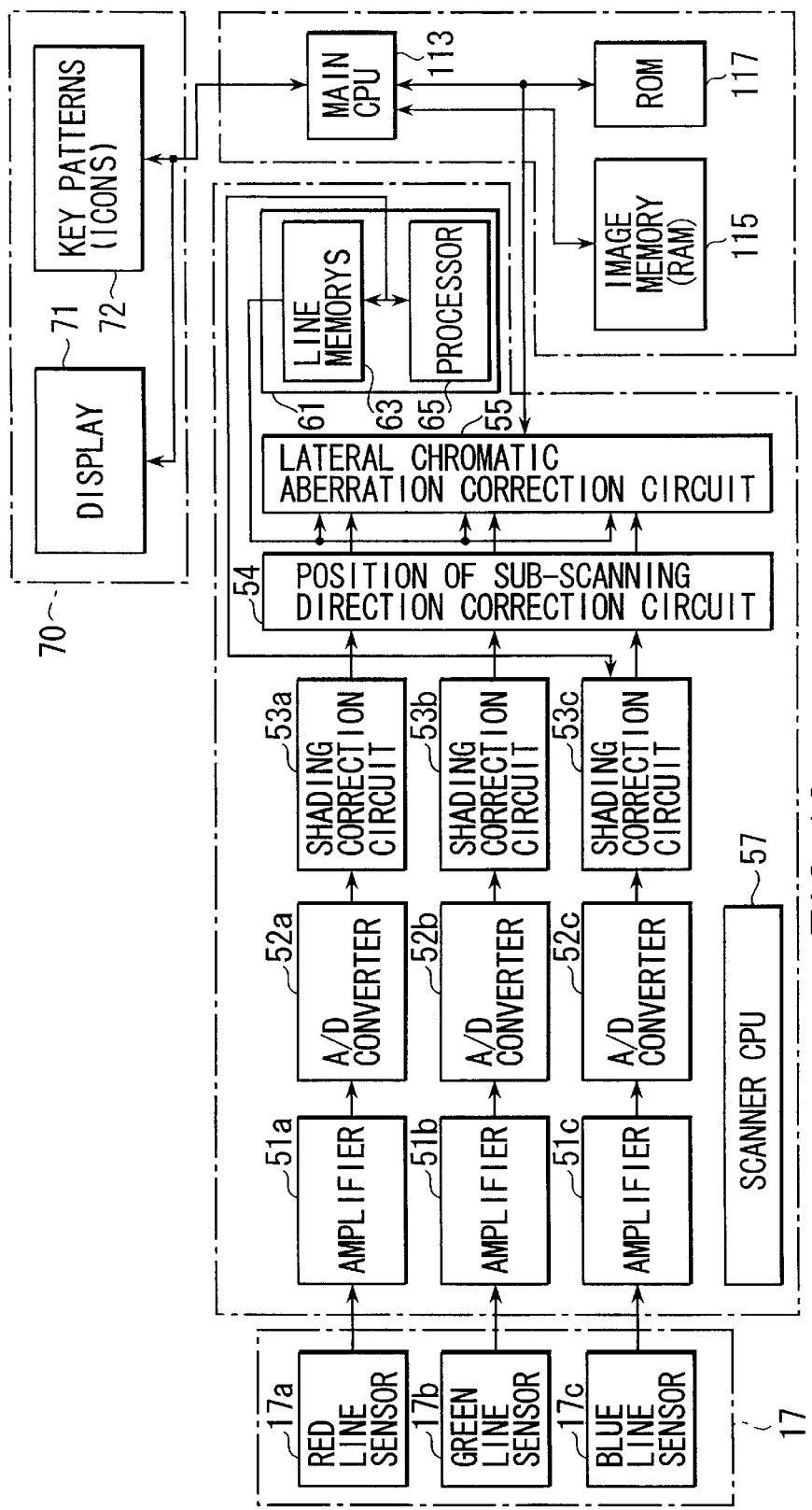
FIG. 16 is a schematic diagram showing another example of the image processing circuit shown in FIG. 4.

FIG. 16 is a schematic diagram for describing an example of installing the correction coefficient parameter generating section corresponding to the correction coefficient parameter generating unit described referring to FIG. 4 in the image processing circuit of the image reader. To the configuration described before and similar configuration, the like reference numerals are assigned and detailed description will be omitted.

As shown in FIG. 16, the image signals outputted from the R line sensor 17a, G line sensor 17b, and B line sensor 17C of the 3-line CCD sensor 17, respectively, are inputted to the amplifiers 51a, 51b, and 51c, and are amplified to the predetermined level by the control of the scanner CPU 57.

Each of the image signals amplified by each of amplifiers 51a, 51b, and 51c is converted to the digital signal by the corresponding A/D converters 52a, 52b, and 52c, and inputted to the corresponding shading correction circuits 53a, 53b, and 53c, and inputted to the position sub-scanning correction circuit 54 of the next stage with the reference values of white level and black level corrected in conformity to the threshold level set on the basis of the reflected light from the white reference plate 19 in advance.

The image signal inputted to the position sub-scanning correction circuit 54 generates the correction coefficient parameter by providing the predetermined arithmetic similar to that explained before at the data processing section 65 equipped with the correction coefficient parameter generator unit 61 for finding the center-of-balance positions Pr, Pg, Pb at each color for every 10 pixels (black and white pair-line width when resolution is 600 dpi) which are intervals of black and white pair lines by the weighted means from the line memory 63 that can hold the image data from each of sensors 17a, 17b, 17c, obtained from one reading by the 3-line sensor 17 and the image data held in the line memory 63. The predetermined processing to the image data from each line sensor temporarily stored in the line memory 63 can be set by the user by the use of GUI, character generator, and the like not illustrated and equipped to the main control board 111 of the image forming apparatus 101, and the key pattern and control information displayed on the display 71 of the operation panel 70 incorporated in the image forming apparatus 101 by the control of the main CPU 113.

For example, when the user selects "Lateral Chromatic Aberration Adjustment Mode" from several key patterns (icons) displayed on the display 71, the lamp of the lighting unit 13 turns on, the image light of the chart MS set to the original table 12 is formed by each of line sensors 17a, 17b, and 17c of the 3-line CCD sensor 17, and is photoelectrically converted by each line sensor, and then digitized, thresholded at the predetermined threshold level, and inputted to the position sub-scanning correction circuit 54 as described above.

Thereafter, in the same manner as described before, the center-of-balance positions Pr, Pg, and Pb at each color for every 10 pixels which are intervals of black and white pair lines are calculated from the image data by the control of the scanner CPU 57 in conformity to Eqs. (3), (4), and (5), and then, $D_R$ and $D_B$ which are the reading position deviation amounts between R and G as well as between B and G are found in conformity to Eqs. (6) and (7).

Now, by using the position deviation amount found, in the same manner as described in, for example, FIG. 14 and its description, the position deviation amount ($D_R$, $D_B$) with respect to the pixel position i is approximated by the linear expression shown in, for example, FIG. 13A, and correction coefficient parameters $K_R$, $K_B$, $L_R$, and $L_B$ are generated.

Successively, from the correction coefficient parameters found in conformity to the above-mentioned rule, the correction coefficient at each pixel position is deduced, and the position deviation is corrected, respectively, in conformity to Equations (1) and (2).

That is, with respect to $R_S$ corresponding to the R image signal generating the position deviation in the sub-scanning direction with respect to G at the position of three output signals outputted from the position sub-scanning correction circuit 54, and $B_S$ corresponding to the B image signal, the data for a total of 3 pixels of the i-th pixel to be corrected and (i−1)th pixel and (i+1)th pixel before and after the i-th pixel are generated by the delay memory 55-1, and at the lateral chromatic aberration correction section 55-2, the pixel data (i) is multiplied by the correction coefficient ($K_R$, $K_B$) in conformity to $$D_R = K_R \times i + L_R$$

$$D_B = K_B \times i + L_B$$

to which the correction coefficients ($L_R$, $L_B$) are further added. By this operation, as in the example explained before, the position deviation amounts of R output signal outputted from the R line sensor 17a and the B output signal outputted from the B line sensor 17c with respect to the G output signal outputted from the G line sensor 17b of the 3-line CCD sensor 17 are suppressed to a very small range as in the case shown in FIG. 15.

In this way, the image signal of each color with the deviation of reading position of the original in the sub-scanning direction (at the same time) when the data is read by each of line sensors 17a, 17b, and 17c corrected is inputted to the image processing circuit 56 of the next stage by the control of the scanner CPU 57.

The image signal inputted to the image processing circuit 56 has, for example, color correction (change of color balance) and concentration corrected by the control of the scanner CPU 57, and is held in the image memory (RAM) or the buffer memory 115 by the control of the main CPU 113 of the main control board 111 of the image forming section 101 as the output image signal for each image forming section of the image forming apparatus 101 to form images for each color component.

As described above, the color image reader according to the present invention comprises a plate-shape reading subject holder which can transmit light and holds the subject to be read;

a lighting device for illuminating the subject to be read on the reading subject holder;

a reducing lens for providing convergence to the image light form the subject to be read;

a 3-line CCD sensor for receiving the image light with convergence given by the reducing lens and outputting three electrical signals corresponding to the image light; and a lateral chromatic aberration correction circuit which can find the position deviation amounts of all the pixels in one processing because one output signal of the three output signals outputted from the 3-line CCD sensor is used as a reference, and the two remaining output signals are compared with the output signal used for the reference, and the predetermined correction is provided for the two remaining output signals.

The color image reader according to the present invention can calculate a subtle reading position deviation amount smaller than the pixel size by finding the center-of-balance position of wave form from the CCD output wave form obtained by reading the fine line image of the black-and-white pair line.

In addition, the color image reader according to the present invention can calculate the position deviation amount at all the pixel positions in the main scanning direction from the data for several lines corresponding to the gradient angle using the pattern with the gradient in the sub-scanning direction.

Furthermore, the color image reader according to the present invention can correct color deviation at all the pixel positions in the main scanning direction by approximating the position deviation amount distribution in the main scanning direction with the function, finding parameters expressing the function from the measured data of position deviation amount, and using the approximation formula.

Still in addition, the color image reader according to the present invention can measure the position deviation amount smaller than the pixel size by calculating the center-of-balance position of the black-and-white pair line.

Still furthermore, the present invention is characterized in that it can provide a adjusting apparatus that can measure the position deviation amount less than the pixel size, generate the correction parameter based on it, and store the data in the correction memory by calculating the center-of-balance position of the black-and-white pair line.

The color image reader according to this invention is characterized in that it measures the position deviation amount less than the pixel size, generates the correction parameter based on it, and stores the data in the correction memory by calculating the center-of-balance position of the black-and-white pair line.

The color image reader according to the present invention can measure the position deviation amount corresponding to all the pixel positions in the main scanning direction from the data of a plurality of lines corresponding to the gradient angle by tilting the black-and-white pair line chart in the sub-scanning direction.

The color image reader according to the present invention can measure the position deviation amount corresponding to all the pixel positions in the main scanning direction by the use of black and white continuous patterns which tilt in the sub-scanning direction and utilizing the edge information of the black-and-white line change-over section from the data of a plurality of lines.

The color image reader according to the present invention can measure the position deviation amount corresponding to all the pixel positions in the main scanning direction by setting the tilt angle of the chart comprising a plurality of lines to 45° and finding the line data with the same number of pixels as that of the pattern cycle.

The color image reader according to the present invention can correct the position deviation at all the pixel positions in the main scanning direction by approximating the position deviation amount distribution by a linear expression, storing the parameters expressing the linear expression only in the memory, and utilizing the parameters.

The color image reader according to the present invention can correct the position deviation at all the pixel positions in the main scanning direction by approximating the position deviation amount distribution by a linear expression, storing the parameters expressing the polynomial expression only in the memory, and utilizing the parameters.

The color image reader according to the present invention can correct the position deviation at all the pixel positions in the main scanning direction by dividing the position deviation amount distribution into a plurality of sections, approximating the distribution of each section by the linear expression, storing the parameters expressing the linear expression only in the memory, and utilizing the parameters.

The color image reader according to the present invention can correct the position deviation at all the pixel positions in the main scanning direction by approximating the distribution of position deviation amount from the actual measured data of the position deviation in the vicinity of the characteristic positions including the maximum value, minimum value, and both ends, storing the parameters of the approximate expression only in the memory, and utilizing the parameters.

The present invention is characterized by providing an adjusting apparatus that can approximate the distribution of position deviation amount by a linear expression, stores parameters expressing the linear expression only in the memory, and correct color deviation at all the pixel positions in the main scanning direction by using the parameters.

The present invention is characterized by providing an adjusting apparatus that can measure the position deviation amount corresponding to all the pixel positions in the main scanning direction by the use of black and white continuous patterns which tilt in the sub-scanning direction and utilizing the edge information of the black-and-white line changeover section from the data of a plurality of lines.

The present invention is characterized by providing an adjusting apparatus that can tilt the black-and-white pair line chart in the sub-scanning direction and measure the position deviation amount corresponding to all the pixel positions in the main scanning direction from the data of a plurality of lines corresponding to the gradient angle.

What is claimed is:

1. A color image reader comprising:
   a reading object holder, having plate shape and which can transmit light, for holding a subject to be read;
   a lighting device for illuminating the subject to be read on the reading object holder;
   a reducing lens for providing convergence to the image light from the reading object;
   a 3-line CCD sensor for receiving the image light with convergence given by the reducing lens and outputting three electrical signals corresponding to the image light; and
   a lateral chromatic aberration correction circuit for storing only parameters representing an approximate expression or linear expression for correcting color deviation in all pixel positions in a main scanning direction, for designating one output signal of the three output signals outputted from the 3-line CCD sensor to the reference, for comparing the two remaining output signals with the output signal used for the reference, and for providing a predetermined correction to the two remaining output signals,
   wherein the 3-line CCD sensor contains three sets of line sensors arranged on the same plane in parallel to one another, and are positioned in such a manner that the image light passing through the center of the reducing lens impinges on the line sensor located at the center of the three sets of the line sensors, and
   wherein the lateral chromatic aberration correction circuit finds the difference of the outputs corresponding to the optional pixel in each of the two remaining outputs with respect to the output of the center line sensor to the optional pixel for the three outputs outputted by the 3-line CCD sensor.

2. The color image reader according to claim 1, wherein the lateral chromatic aberration correction circuit determines the difference of outputs of the remaining two outputs corresponding to the optional pixels with respect to the output used for the reference to the optional pixel for the three outputs outputted by the 3-line CCD sensor.

3. The color image reader according to claim 1, wherein the lateral chromatic aberration correction circuit finds the difference of the outputs corresponding to optional pixels in each of the two remaining outputs with respect to the output used for the reference to the optional pixel for the three outputs outputted by the 3-line CCD sensor.

4. The color image reader according to claim 1, wherein the lateral chromatic aberration correction circuit corrects the lateral chromatic aberration with respect to the output of the center line sensor by $D_2$ and $D_3$ defined by the second signal output at the i-th pixel: $i_2$ expressed by $$i_2 \text{ new} = (n+1-D_2) \times i_{2+n} + (D_2-n) \times i_{2+n+1}$$

where n is an integer that satisfies $n \leq D_2 < n+1$ and $i_2$ new is $i_2$ after correction, and the third signal output of the i-th pixel: $i_3$ is expressed by $$i_3 \text{ new} = (n+1-D_3) \times i_{3+n} + (D_3-n) \times i_{3+n+1}$$

where n is an integer that satisfies $n \leq D_3 < n+1$ and $i_3$ new is $i_3$ after correction, for the second output and the third output, which are two remaining outputs corresponding to the optional pixel outputs of the center line sensor.

5. The color image reader according to claim 1, wherein the image signal outputted by the center line sensor of the three outputs outputted by the 3-line CCD sensor is green (G), the image signal outputted by the second line sensor deviated in the first direction with respect to the light passing through the center of the reducing lens is red (R), and the image signal outputted by the third line sensor deviated in the second direction opposite to the first direction with respect to the center of the reducing lens is blue (B).

6. The color image reader according to claim 5, wherein the lateral chromatic aberration correction circuit finds the centers of balance $P_R$, $P_G$, and $P_B$ of image signals of respective colors, by $$P_R = \Sigma(Ri \times i)/\Sigma Ri \ (i=j \text{ to } k),$$

$$P_G = \Sigma(Gi \times i)/\Sigma Gi \ (i=m \text{ to } j),$$

and $$P_B = \Sigma(Bi \times i)/\Sigma Bi \ (i=m \text{ to } j),$$

when the number of optional pixels is expressed by j through k for the outputs of red image and blue image corresponding to the output of optional number of pixels of green, and corrects the lateral chromatic aberration with respect to the output of the center line sensor by $D_R$ and $D_B$ defined by $$D_R = P_R - P_G$$

and $$D_B = P_B - P_G.$$

7. The color image reader according to claim 5, wherein the lateral chromatic aberration correction circuit corrects the lateral chromatic aberration with respect to the output of the center line sensor by $D_R$ and $D_B$ defined by the following linear expressions $$D_R = K_R \times i + L_R,$$

and $$D_b = K_B \times i + L_B$$

where, $K_R$, $L_R$, $K_B$ and $L_B$ are parameters, with respect to mutual deviations of the red image output and blue image output corresponding to the output of optional green pixel i.

8. The color image reader according to claim 7, wherein in the lateral chromatic aberration correction circuit, the individual parameters $K_R$, $L_R$, $K_B$ and $L_B$ are predetermined with respect to the change portion that changes in accordance with the frequency for the 3-line CCD sensor to read the chart image when the black-and-white pair line image contained in the chart for the 3-line CCD sensor to read the image has a predetermined angle with respect to the direction in which the 3-line CCD sensor reads the chart image.

9. The color image reader according to claim 1, wherein the lateral chromatic aberration circuit does not store patterns for correction.

10. A color image forming apparatus comprising:

a color image reader including:
- a reading object holder, having plate shape and which can transmit light, for holding a reading object;
- a lighting device for illuminating the reading object on the reading object holder;
- a reducing lens for giving convergence to the image light from the reading object;
- a 3-line CCD sensor for receiving the image light with convergence given by the reducing lens and outputting three electrical signals corresponding to the image light; and
- a lateral chromatic aberration correction circuit for storing only parameters representing an approximate expression or linear expression for correcting color deviation in all pixel positions in a main scanning direction, for designating one output signal of the three output signals outputted from the 3-line CCD sensor to the reference, for comparing the two remaining output signals with the output signal used for the reference, and for providing a predetermined correction to the two remaining output signals;

an exposure device for irradiating the exposed light with the light intensity varied in correspondence with the output image signal generated by the color image reader to a predetermined position;

the first and the second image forming apparatus in which each of the image forming apparatuses comprises a photosensitive material which is a light receptor, a developing apparatus for selectively supplying the visualized material to the photosensitive material, a transcription apparatus for transcribing the visualized material from the photosensitive material to the transferred material, wherein individual image forming apparatus which supply the visualized material by the developing apparatus to the latent image formed on the photosensitive material by the exposed light irradiated from the exposure apparatus to visualize the image and form the visualized image are disposed in a predetermined arrangement, and form a plurality of toner images for each color component in correspondence with the output image signals for each color component supplied from the color image reader in conformity to time series;

a transferred material conveying mechanism located at a predetermined position with respect to each of the transcription apparatus of the first and the second image forming apparatus and conveying the visualized image formed by the first and the second image forming apparatus transcribably onto the transferred material while the transferred material fed from the storage section is being conveyed; and a fixing apparatus including a heating mechanism and pressurizing mechanism, for fixing the visualized image transferred on the transferred material to the transferred material being conveyed by the transferred material conveying mechanism.

11. The color image forming apparatus according to claim 10, wherein the lateral chromatic aberration circuit does not store patterns for correction.

* * * * *